United States Patent [19]
Danusso et al.

[11] Patent Number: 5,476,918
[45] Date of Patent: Dec. 19, 1995

[54] FLUORINE-CONTAINING COMPOUNDS HAVING POLYACETALIC STRUCTURE, AND PROCESS FOR PREPARING THEM

[75] Inventors: Ferdinando Danusso, Milan; Ezio Strepparola, Treviglio; Marinella Levi, Milan; Claudio Tonelli, Concorezzo; Stefano Turri, Milan, all of Italy

[73] Assignee: Ausimont, S.p.A., Milan, Italy

[21] Appl. No.: 58,014

[22] Filed: May 5, 1993

[30] Foreign Application Priority Data

Aug. 14, 1992 [IT] Italy .................. MI92A1990

[51] Int. Cl.$^6$ ............... C07C 43/30; C07C 43/313; C08G 2/38; C08G 4/00
[52] U.S. Cl. ............... 528/244; 528/230; 568/603; 568/604
[58] Field of Search .................. 568/603, 604; 528/244, 230

[56] References Cited

U.S. PATENT DOCUMENTS

| | | |
|---|---|---|
| 3,544,537 | 12/1970 | Brace et al. |
| 3,766,251 | 10/1973 | Caporiccio et al. |
| 3,810,874 | 5/1974 | Mitsch et al. |
| 3,847,978 | 11/1974 | Sianesi et al. |
| 4,085,137 | 4/1978 | Mitsch et al. |
| 4,647,413 | 3/1987 | Savu. |
| 4,740,628 | 4/1988 | Adolph et al. ............ 568/603 |
| 4,814,372 | 3/1989 | Caporiccio et al. |

FOREIGN PATENT DOCUMENTS

| | | |
|---|---|---|
| 0148482A2 | 7/1985 | European Pat. Off. |
| 0151877A2 | 8/1985 | European Pat. Off. |

OTHER PUBLICATIONS

*Journal of Polymer Science*, "Synthesis of Polyformals From Nitro- and Fluorodiols. Substituent and Chainlength Effects.", Adolph, et al., vol. 25, pp. 805–827 (1987).

*Journal of Polymer Science*, "Nitro- and Fluoropolyformals. II. Novel Polyformals From α, ω-Fluoro- and Nitrodiols", Adolph, et al, vol. 29, pp. 719–727, (1991).

European Search Report dated Jan. 27, 1994 of EP 93 10 9104.

"Preparation of Fluorine–Containing Polyethers"; Trischler, et al.; Journal of Polymer Science: Part A–1; vol. 5, pp. 2343–2349, 1967.

*Primary Examiner*—Johann Richter
*Assistant Examiner*—Laura L. Stockton
*Attorney, Agent, or Firm*—Bryan Cave

[57] ABSTRACT

1) New fluorine-containing compounds having polyacetalic structure, of general formula:

$$(I)[Rf_m\text{—}CH_2O(CH_2O)_c\text{—}CH_2]_n$$

where:
  Rf=a perfluorooxyalkylene chain having $\overline{M}n$ from 500 to 5,000;
  m=4–25;
  c=1–10;
  n=2–100.

2) A process for preparing them, which comprises carrying out the polycondensation of diols having formula:

$$(II)\ HORfOH$$

with formaldehyde, in mass or in the presence of solvents, in an acid medium. The compounds of formula (I) can be oligomeric compounds (polymerization degree $\overline{x}_n$ from 2 to about 20) or polymeric compounds ($\overline{x}_n$ from about 20 to about 100). They exhibit a high stability to heat and to chemical agents, and Tg values slightly different from the ones of the diols utilized for preparing them.

7 Claims, No Drawings

FLUORINE-CONTAINING COMPOUNDS HAVING POLYACETALIC STRUCTURE, AND PROCESS FOR PREPARING THEM

The present invention relates to new fluorine-containing compounds having polyacetalic structure, in the form both of oligomers and of polymers.

The polyacetals, as products of the polycondensation between aliphatic alcohols and aldehydes, are known in the art.

In particular polyacetals obtained by polycondensation of dialcohols having fluorocarbon chains with formaldehyde are known.

Information on these products is contained in the articles by F. D. Trischler and J. Hollander in J. Pol. Sci. Al(5), 2343 (1967), and by H. G. Adolph, J. M. Goldwasser, W. M. Koppes, in J. Pol. Sci. Part A, 25, 805 (1987).

According to the authors, the copolymerization of the diols having fluorocarbon chains with formaldehyde, in the presence both of organic acids and of mineral acids yields only oligomeric products.

Such products, having a double hydroxylic functionality, exhibit, however, rather high Tg values, wherefore they are not suited to be used as macromonomers in copolymerization reactions aiming at the production of polymers endowed with low Tg values.

Moreover, they have very low resistance to hydrolysis, and thus decompose when contacted with acids or bases.

Applicants have now found a new class of fluorinated compounds having polyacetalic structure, in the form of oligomers or of polymers, endowed with exceptionally low Tg values and surprisingly high resistance to chemicals, in particular to acid and bases.

Depending on their molecular weight, they can be used as macromonomers for preparing copolymers having low Tg values, or as polymers themselves, having low Tg values.

Such compounds, which are the object of the present invention, have in the general formula:

(I) [Rf—CH$_2$O(CH$_2$))$_c$—CH$_2$]$_n$— where:

c=1–10, extremes included, but preferably=1, n=2–100, extremes included,

Rf=a polyfluorooxyalkylene chain having an average molecular weight ($\overline{Mn}$) ranging from 500 to 5,000, but preferably from 1,000 to 2,000, comprising monomeric units having at least one of the following structures randomly arranged along the chain:

(—CFO—), (—CF$_2$CF$_2$O—), (—CF$_2$CF$_2$CF$_2$O—),
  |
  X (—CH$_2$CF$_2$CF$_2$O), (—CFCF$_2$O), (—CF$_2$CFO—),
               |           |
               CF$_3$   CF$_3$

In particular, in such formula (I) the Rf chain can have one of the following structures:

1) CF$_2$O—(CF$_2$O)$_a$—(CF$_2$CF$_2$O)$_b$—$_{CF2}$— with a/b ranging from 0.5 to 2, extremes included;

2) —CF$_2$O—(CF$_2$—CF$_2$O)—$_b$CF$_2$—

3) —CF$_2$O—(C$_3$F$_6$O)$_r$—(C$_2$F$_4$O)$_b$—(CFXO)$_t$ —CF$_2$—, with

4) CF$_2$O—(C$_3$F$_6$O)—$_r$(CFXO)$_t$—CF$_2$—, with r/t=10–30

5)

—CF—
 |
 CF$_3$ (OCF$_2$CF)$_z$—OCF$_2$(R'f)$_y$—CF$_2$O—(CFCF$_2$O)$_z$—CF—
  |                              |         |
  CF$_3$                          CF$_3$  CF$_3$

6)  —CF$_2$CH$_2$(OCF$_2$CF$_2$CH$_2$)$_q$—OCF$_2$  (R'f)$_y$—O—(CH$_2$CF$_2$CF$_2$O)$_s$CH$_2$CF$_2$— in which:

X=F, —CF$_3$;

—(C$_3$F$_6$O)— can represent units of formula

—(CFCF$_2$O)—  and/or  —(CF$_2$—CFO)—
  |                                    |
  CF$_3$                                   CF$_3$ a, b, r, s, t, z are integers ranging from 0 to 100, the sum of which is such that Rf exhibits $\overline{M}_n$ values ranging from about 500 to about 5,000, and preferably ranging from 1,000 to 2,000, with a molecular weight distribution preferably ranging from 1.1 to 2.5;

R'f=a perfluoroalkylene group containing 1 to 4 carbon atoms;

y=0 or 1.

Minor amounts of monomeric units of formula —(CF$_2$CF$_2$CF$_2$CF$_2$O)— can be present also in the Rf chain.

The polyacetals of formula (I) are prepared by reacting a formaldehyde solution in an acid medium, the acidity of which results from the presence of H$_2$SO$_4$, optionally in the presence of inert organic solvents, with a diol having a polyfluorooxyalkylene chain of general formula:

(II) HOCH$_2$RfCH$_2$OH, where Rf is the same as defined hereinbefore, at temperatures ranging from 0° to 100° C.

The solution of formaldehyde in concentrated H$_2$SO$_4$ can be prepared by introducing the formaldehyde as such into the acid or, preferably, it can be produced in the acid itself by decomposition in situ, caused by sulphuric acid, of formaldehyde oligomers or polymers.

Although sulphuric acid is preferred in the formaldehyde formation reaction because it acts both as decomposition agent of the formaldehyde oligomers and polymers, and as dehydration agent during the polycondensation, it is understood that other organic and/or inorganic acids, or mixtures thereof, which exert the same functions, can be used in the present preparation instead of, or along with sulphuric acid. For example it is possible to use trifluoroacetic acid, p-toluenesulphuric acid, canphosulphonic acid, methanesulphonic acid.

The polycondensation reaction is conducted under stirring, in order to obtain a good dispersion of the reagents, and it can be stopped by neutralization of the acid with a base, for example ammonia.

By means of suitable formaldehyde/fluorinated diol/acid stoichiometric ratios it is possible to regulate the molecular weight of the final polycondensation product. For example, if it is operated with sulphuric acid and formaldehyde, diol/formaldehyde molar ratios from 0.25 to 4 and formaldehyde/sulphuric acid molar ratios between 0.1 to 4 permit to obtain products having a lower average polymerization degree ($\bar{x}_n$= number of Rf and —$(CH_2O)_c$ units in the chain) and generally ranging from 2 to about 20.

Conversely, products having a high polymerization degree, ranging from about 20 to about 100, are obtained with diol/formaldehyde/sulphuric acid molar ratios of 0.9–1.1/1.8– 2.2/3.6–4.4.

Lower temperatures, in the above-mentioned range, favour the formation of products having a higher molecular weight. On the other hand, a progressive dilution of the sulphuric acid from 100% to values of 80–50% permits to efficaciously regulate the molecular weight of the products till obtaining oligomeric structures at a higher dilution of the acid.

The above-mentioned diols of formula (II) are known products.

The diols having structure (1), (2) are preparable, for example, according to the methods described in U.S. Pat. Nos. 3,766,251, 3,810,874, 4,085,137 and in European patent application No. 148,482.

The diols having structure (3) to (6) are preparable according to the methods described in U.S. Pat. Nos. 3,544,537, 3,766,251, 4,647,413, 3,847,978, 3,810,874, 4,814,372, and in European patent application 151,877.

On an industrial scale, such diols are generally obtained in admixture with monohydroxylated polyfluorooxyalkylenes of formula:

(III) $R''_f CH_2OH$, where $R''_f$ a polyperfluorooxyalkylene chain having structure: $T O R_f$, where:

T is a fluoroalkyl group containing 1 to 3 carbon atoms, which can contain one or two atoms of chlorine, bromine or hydrogen;

$R_f$ is the same as defined hereinbefore.

As mentioned hereinbefore, the polycondensation reaction between fluorinated diols and formaldehyde can be conducted either in mass or in the presence of solvents.

In the latter case, however, proportionally to the dilution degree there is obtained a decrease in the polycondensation rate besides a reduction of the maximum obtainable molecular weight values.

Utilizable solvents are 1,1,2-trichloro-1,2,2-trifluoroethane (Delifrene LS), 1,2-difluoro-tetrachloroethane, and the haloalkalnes in general.

The products of the invention exhibit Tg values ranging from –60° to –130° C. In particular, the products of the invention, in which Rf has structure (I), exhibit Tg values ranging from –100° to –130° C., but preferably from –107° to –122° C., depending on the molecular weight variations.

In particular it can be observed that the Tg value of the products of the invention varies very slightly with respect to the Tg value of the fluorinated diol utilized for preparing them. Generally, their Tg value is lower by not more than 5° C. than the Tg value of such diol.

Furthermore, as said before, the molecular weight being equal, the products according to the invention have a higher thermal and chemical stability, in particular to hydrolysis, than the polycondensates obtained from the fluorinated aliphatic diols and formaldehyde conforming to the art.

The products of the invention are suitable for particular applications as a function of their molecular weight and, therefore, of their viscosity.

The products of oligomeric nature (having a number average molecular weight up to 20,000) are utilizable as diol macromonomers in polycondensation reactions, or as modifiers for polymeric products, or as agents promoting the compatibility among different liquid phases.

In such applications they represent an advantageous alternative to polyfluorooxyalkylene-chain diols having an equal molecular weight, the preparation of which is, on the whole, less economic.

In fact, said diols have generally a molecular weight lower than 5,000; more particularly, they can be obtained industrially with a molecular weight not higher than 2,500.

Higher molecular weights can be obtained only with specific, expensive enriching processes.

The products having a higher molecular weight are utilizable in the field of the polymeric mixes, or as cross-linkable substrates in order to obtain rubbers endowed with high elastomeric mechanical characteristics at low temperature.

The following examples are given to illustrate the object of the present invention, without limiting however the scope thereof.

On the products obtained according to the examples, the following determinations have been done:

Structure

It was determined through $^1$H NMR and $^{13}$C NMR in a Varian apparatus (300 MHz), which permitted to define the ratio between the various methylene groups present in the chain.

Furthermore, by means of $^{19}$F NMR analysis there were determined the functionality values and the number average molecular weight values.

Tg value

It was determined by means of DSC (calorimeter: Mettler TA 2000; heating programs from –170° to +200° C.; cooling programs from +100° to –170° C.; scanning rate=10° C./minute).

Thermal stability

By means of static and dynamic tests it was determined at which temperature, after one hour, a weight loss of 0.1% takes place. Such temperature was of 220° C. in nitrogen and of 200° C. in air for all the products of the examples.

Chemical stability

The chemical stability to acid agents (HCl) and to basic agents (NaOH) was determined according to ASTM D483–84 standards.

In all the products of the examples, no substantial variation in the molecular weight and molecular weight distribution was observed for exposure periods up to one month.

A few data on the preparation and characteristics of the products according to the examples are reported on Tables 1 and 2.

EXAMPLE 1

In a 100 ml flask there were dissolved, at room temperature, 300 mg of paraformaldehyde in 1.1 ml of $H_2SO_4$ at 96%; a limpid solution was obtained.

To this solution there were added, under stirring, 10 g of a diol of formula:

$HOCH_2$—$CF_2O$—$(CF_2O)_a$—$(CF_2CF_2O)_b$ $CF_2CH_2OH$ wherein b/a=1,
having a number average molecular weight ($\overline{Mn}$)=2,050, a functionality=1.95 and a Tg value=–113° C.

The mixture was maintained under stirring as long as that was permitted by its viscosity.

After 24 hours the reaction mixture was dissolved in 1 liter Delifrene LS$^{(R)}$ and the sulphuric acid contained therein was neutralized by addition of 20 ml of a 2 M solution of $NH_3$ in Delifrene LS.

The precipitated ammonium sulphate was filtered and the solvent was evaporated to constant weight.

The resulting residue had the following structure:

$$[(-CF_2O-(CF_2O)_a-(CF_2CF_2O)_bCF_2)-CH_2OCH_2OCH_2]_n$$

where $\overline{X}_n=29$, b/a=1, n=14.

EXAMPLE 2

It was operated as in example 1, with the exception that the number average molecular weight of the diol was equal to 1,050, and the diol had a Tg temperature equal to $-107°$ C.

TABLE 1

Values of the main process variables in the various examples

| Example | Diol functionality | Formaldehyde mols / diol mols | $H_2SO_4$ conc. (%) | Temperature (°C.) | Reagents/solvent concentration (%) |
|---|---|---|---|---|---|
| 1 | 1,950 | 2 | 96 | 25 | 100 |
| 2 | 1,95 | 2 | 96 | 25 | 100 |

For all the examples, the ratio; $H_2SO_4$ mols/formaldehyde mols was maintained equal to 1.97; the test time was of 24 hours.

TABLE 2

Main characteristics of the products corresponding to the examples as per Table 1.

| Example | $\overline{Mn}$ | $\overline{x}_n$ | $\overline{Mw}$ | [η] 30° Delifrene LS | Tg |
|---|---|---|---|---|---|
| 1 | 29,000 | 29 | 70,000 | 0,20 | −117,5 |
| 2 | 15,000 | 30 | 28,000 | 0,10 | −111,0 |

We claim:

1. Fluorine-containing polyacetals having the formula:

$$[-R_f-CH_2O(CH_2O)_c-CH_2-]_n$$

wherein c is from 1 to 10, extremes included;

n is from 2 to 100, extremes included; and $R_f$ is a polyfluoroxyalkylene chain having the formula:

$$-CF_2O-(CF_2O)_a-(CF_2CF_2O)_b-CF_2-$$

and an average molecular weight $M_n$, from 500 to 5000, and an a/b ratio from 0.5 to 2, extremes included, wherein the $-CF_2O-$ and $-CF_2CF_2O-$ groups are randomly distributed along the chain.

2. The polyacetals of claim 1, wherein the average molecular weight $M_n$ of the $R_f$ chain is from 1000 to 2000.

3. The polyacetals of claim 1, wherein the molecular weight distribution of the $R_f$ chain is from 1.1 to 2.5.

4. The polyacetals of claim 1, wherein the polyacetals have an average polymerization degree $X_n$ of from 2 to 20.

5. The polyacetals of claim 1, wherein the polyacetals have an average polymerization degree $X_n$ of from 20 to 100.

6. The polyacetals of claim 1, wherein the polyacetals have a glass transition temperature $T_g$ of from $-100°$ C. to $-130°$ C.

7. The polyacetals of claim 6, wherein the glass transition temperature $T_g$ is from $-107°$ to $-122°$ C.

* * * * *

UNITED STATES PATENT AND TRADEMARK OFFICE
CERTIFICATE OF CORRECTION

PATENT NO. : 5,476,918

DATED : December 19, 1995

INVENTOR(S) : Ferdinando Danusso, et al.

It is certified that error appears in the above-indentified patent and that said Letters Patent is hereby corrected as shown below:

| Column | Line | Delete | Insert |
|---|---|---|---|
| 5 | 41 | "$[-R_f-CH_2O(CH_2O)_c-CH_2-]_c$" | -- $[R_f-CH_2O(CH_2O)_c-CH_2]_n$- -- |

Signed and Sealed this

Second Day of April, 1996

Attest:

BRUCE LEHMAN

*Attesting Officer*    *Commissioner of Patents and Trademarks*